(12) United States Patent
Chapman

(10) Patent No.: US 8,459,684 B1
(45) Date of Patent: Jun. 11, 2013

(54) FIFTH WHEEL SWITCHING APPARATUS

(76) Inventor: Jeffrey L. Chapman, Brunswick, GA (US)

(*) Notice: Subject to any disclaimer, the term of this patent is extended or adjusted under 35 U.S.C. 154(b) by 365 days.

(21) Appl. No.: 13/020,559

(22) Filed: Feb. 3, 2011

Related U.S. Application Data

(60) Provisional application No. 61/301,068, filed on Feb. 3, 2010.

(51) Int. Cl.
B62D 53/06 (2006.01)

(52) U.S. Cl.
USPC ........................................ 280/407.1; 280/408

(58) Field of Classification Search
USPC ................... 280/408, 407.1; 410/53; 105/4.1
See application file for complete search history.

(56) References Cited

U.S. PATENT DOCUMENTS

| 2,036,535 A * | 4/1936 | Nelson | 414/800 |
|---|---|---|---|
| 2,553,959 A * | 5/1951 | Cook et al. | 280/407.1 |
| 2,841,094 A * | 7/1958 | Schumacher | 410/53 |
| 4,111,451 A * | 9/1978 | Pinto | 280/408 |
| 4,416,571 A * | 11/1983 | Krause | 410/53 |
| 4,547,107 A * | 10/1985 | Krause | 410/58 |
| 4,650,205 A * | 3/1987 | Jarlsson | 280/408 |
| 4,685,399 A * | 8/1987 | Baker | 105/4.1 |
| 5,107,772 A * | 4/1992 | Viens | 105/159 |
| 5,199,359 A * | 4/1993 | Bedard et al. | 105/168 |
| 6,123,029 A * | 9/2000 | Mobley | 105/4.1 |
| 6,494,476 B2 * | 12/2002 | Masters et al. | 280/426 |

* cited by examiner

Primary Examiner — Paul N Dickson
Assistant Examiner — Daniel Yeagley
(74) Attorney, Agent, or Firm — Jonathan Rigdon Smith, JD, PC; Jonathan R. Smith

(57) ABSTRACT

Two fifth wheels of different throat diameters are mounted facing each other 180 degrees apart on a turntable member that can be rotated on an underlying support member. The underlying support member may be a permanent part on a towing or tractor vehicle, or a detachable part such as a fifth wheel support body. This enables a single towing vehicle to tow semitrailers having kingpins of different sizes without changing the kingpins.

12 Claims, 2 Drawing Sheets

FIFTH WHEEL SWITCHING APPARATUS

TYPE OF APPLICATION

This is a non-provisional application for patent claiming priority of provisional application No. 61/301,068 filed Feb. 3, 2010.

FIELD OF INVENTION

This invention is in the fields of land vehicles, trailers, trailer couplings, trailer tractors, and fifth wheel couplings.

BACKGROUND OF INVENTION

Most fifth wheels are built to accommodate a 2" diameter kingpin, but some heavy-duty semitrailer tractors, such as the HET (Heavy Equipment Transport) used by the U.S. military, carry fifth wheels capable of accommodating 3½" kingpins. Occasionally, it could be of value to have both capabilities available on a single tractor. Some prior art semitrailers have kingpins that may be detached from the trailer so that a kingpin of a different diameter can be reattached. However, not all semitrailers are so equipped, and the ones that are so equipped require that the existing kingpin be removed with a tool and that the alternative kingpin be installed with the tool.

OBJECTS OF INVENTION

The principal object of the instant invention is to enable a single semitrailer tractor to tow trailers having either of two common kingpins. A second object is to permit the change to be made without the use of tools. A third object is to permit towing a trailer in which the kingpin cannot be removed and replaced with a different-sized kingpin.

BRIEF DESCRIPTION OF INVENTION

This invention comprises two fifth wheels of different throat diameters that are mounted facing each other 180 degrees apart on a turntable member that can be rotated on an underlying support member. The underlying support member may be a plate or fifth wheel support body beneath the turntable member, upon which the turntable member can revolve and which in turn can be attached to the tractor structure. Alternatively, the underlying support member can be a portion of the tractor structure itself if it is sufficiently large, strong, and capable of providing a substantially horizontal plane of rotation.

DETAILED DESCRIPTION OF INVENTION

Figure 1:
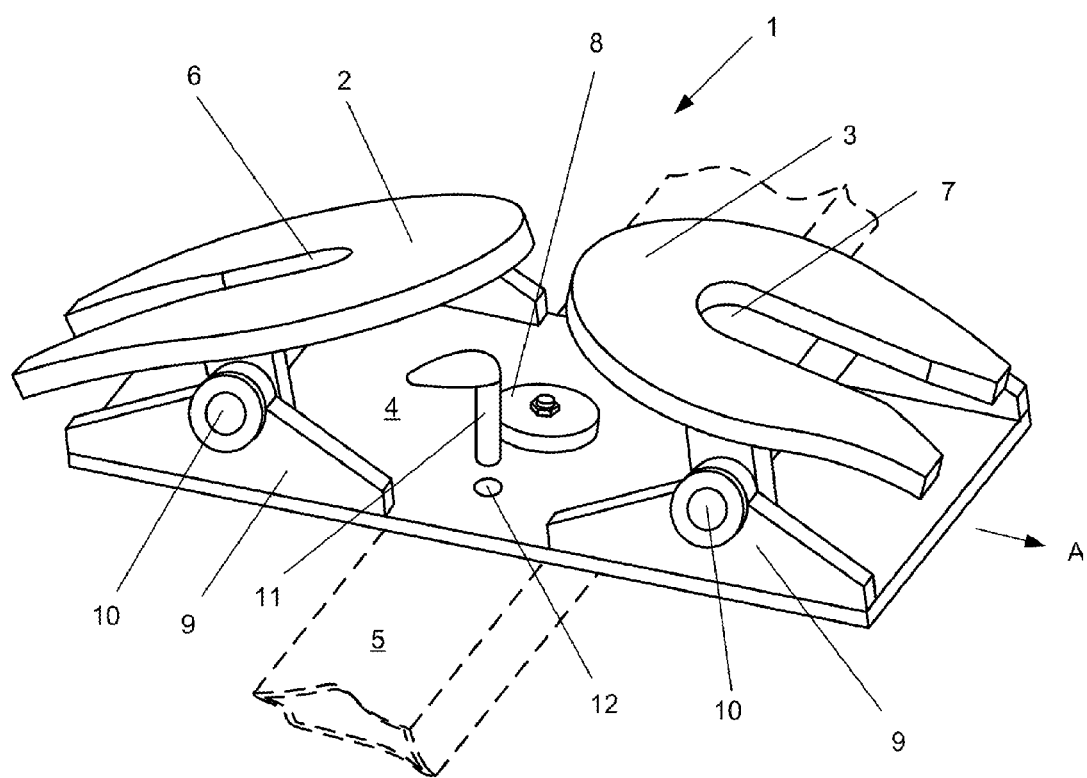
FIG. 1 is a perspective view of the preferred embodiment.

Referring now to the drawings, in which like elements in each drawing are represented by like reference numerals, FIG. 1 shows the preferred embodiment 1 of the present invention. It consists of a first fifth wheel 2 having a 2" throat 6 and a second fifth wheel 3 having a 3½" throat 7 fixedly mounted facing each other on a turntable member 4. The turntable member 4 is attached via a pivot means 8 to an underlying support member, in this case a horizontal tractor vehicle part 5 (shown in dashed lines to indicate environmental structure). The first and second fifth wheels are attached to the turntable member 4 by brackets 9 and pitch axis pivots 10 commonly used in the art.

FIG. 1 shows the second fifth wheel 3 facing rearwardly on the vehicle part 5 as designated by direction arrow A. In this position, a trailer having a 3½" kingpin (not shown) can be connected to the tractor by engaging the kingpin into 3½" throat 7 as commonly known in the art. If it is desired to tow a trailer having a 2" kingpin, turntable member 4 can rotated manually 180 degrees to the left or right about pivot means 8. A turntable locking means may be employed to prevent the turntable member 4 from rotating during towing of a trailer. As depicted here, by example and not limitation, the locking means consists of a pin 11 inserted into a hole 12 through turntable member 4 which cooperates with another hole (not visible) in vehicle part 5 below the turntable.

Although the depicted embodiment of the invention utilizes manual rotation of the turntable member 4, other embodiments within the scope of this invention can employ other means of turntable rotation such as a power drive or other motive device interposed between the turntable member 4 and the vehicle, which can be adapted to this invention without undue experimentation.

Figure 2:
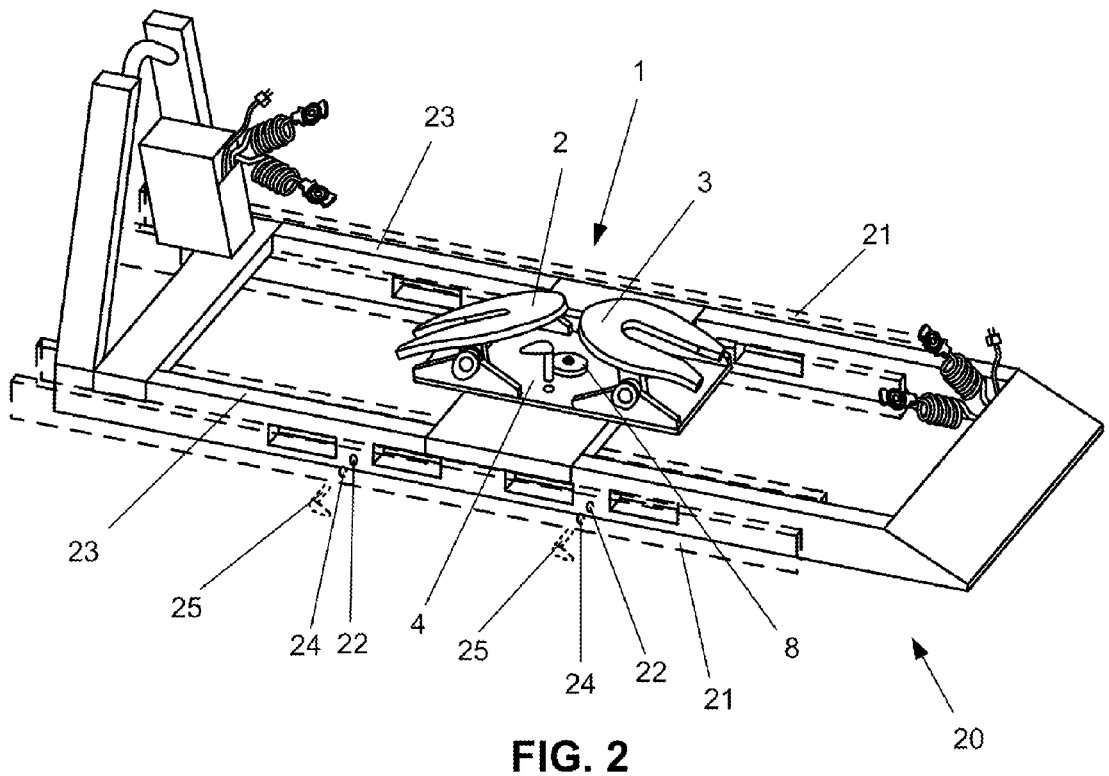
FIG. 2 shows the preferred embodiment installed on a fifth wheel support body.

FIG. 2 illustrates another embodiment of the invention which combines the preferred embodiment 1 with an underlying support 20. The underlying support 20 is provided for attachment of turntable member 4 to a tractor vehicle such as the HEMTT hook lift vehicle used by the U.S. armed forces (not shown). The underlying support 20 in this embodiment of the instant invention is an apparatus taught by U.S. Pat. Nos. 6,431,577 and 6,631,917, a fifth wheel support body, except that the single fifth wheel depicted in those patents' drawings is replaced by turntable member 4 and appurtenant structures described above as the preferred embodiment 1. U.S. Pat. Nos. 6,431,577 and 6,631,917 are incorporated herein as references in their entirety.

The underlying support 20 is equipped with horizontal rails 23 and one or more rail holes 22 to attach this embodiment to the tractor vehicle. This tractor vehicle is specially configured with horizontal channels 21 fixed to it (shown in dashed lines as environmental structure) which are sized to hold rails 23. One or more channel holes 24 are placed through the channels 21 to accept one or more channel pins 25 (both shown in dashed lines as environmental structure) which also pass through the rail holes 22, thereby fastening the underlying support 20 to the vehicle (not shown) of which channels 21 are parts.

Yet another embodiment of the invention may include an underlying support different from the underlying support 20 depicted in FIG. 2. Such different underlying support could be shaped, without undue experimentation, for attachment to an alternative tractor vehicle either temporarily or permanently depending on the structure of the vehicle. Examples of such alternative tractor vehicles are the HET tractor used by the U.S. armed forces and various commercial freight semitrailer tractors.

The invention claimed is:
1. A fifth wheel switching apparatus, comprising:
a substantially horizontal turntable rotatable about a substantially vertical axis;
the turntable further comprising an upper side and a lower side, a first end and a second end;
the upper side of the turntable comprising
a first fifth wheel having a first throat and being mounted on the first end facing the second end; and a second fifth wheel having a second throat and being mounted on the second end facing the first end.

2. The apparatus of claim 1, in which:
said turntable further comprises means for locking said turntable in a plurality of horizontal orientations about said vertical axis.

3. The apparatus of claim 2, in which:
said plurality of horizontal orientations are two orientations approximately 180 degrees apart; and
said lower side is mounted on a support.

4. The apparatus of claim 3, in which:
said support is taken from the list of:
a) a part of a vehicle; and
b) a fifth wheel support body.

5. The apparatus of claim 3, in which:
said first throat is of a first diameter; and
said second throat is of a second diameter different from the first diameter.

6. The apparatus of claim 5, in which:
said first diameter is 3½ inches; and
said second diameter is 2 inches.

7. A fifth wheel switching apparatus, comprising:
a support structure having a front end and a rear end;
a turntable in place of a single fifth wheel, rotatable relative to the support structure and having a first end and a second end;
the first end supporting a first fifth wheel;
the second end supporting a second fifth wheel;
the first fifth wheel and second fifth wheel facing each other approximately 180 degrees apart; and
a means for locking the turntable relative to the support structure so that the turntable is oriented in a direction taken from the list of:
a) the first end of the turntable facing the front end of the support structure; and
b) the second end of the turntable facing the front end of the support structure.

8. The apparatus of claim 7, in which:
said support structure is taken from the list of:
a) a part of a vehicle; and
b) a fifth wheel support body.

9. The apparatus of claim 8, in which:
said first fifth wheel has a throat of a first diameter; and
said second fifth wheel has a throat is of a second diameter different from the first diameter.

10. The apparatus of claim 9, in which:
said first diameter is 3½ inches; and
said second diameter is 2 inches.

11. A fifth wheel switching apparatus, comprising:
a substantially horizontal turntable rotatable about a substantially vertical axis;
the turntable further comprising
an upper side, a lower side, a first end, and a second end;
the upper side of the turntable comprising
a first fifth wheel having a first throat and being mounted on the first end facing the second end;
a second fifth wheel having a second throat and being mounted on the second end facing the first end;
the lower side being mounted on a support;
the support having a horizontal centerline;
means for locking the turntable in a first orientation and a second orientation about the vertical axis;
the first orientation and the second orientation being approximately 180 degrees apart and substantially parallel to the horizontal centerline.

12. The apparatus of claim 11, in which:
said support is taken from the list of:
a) a part of a towing vehicle, and
b) a fifth wheel support body.

* * * * *